United States Patent [19]

Furneaux et al.

[11] Patent Number: 4,687,551
[45] Date of Patent: Aug. 18, 1987

[54] POROUS FILMS AND METHOD OF FORMING THEM

[75] Inventors: Robin C. Furneaux, Shenington; William R. Rigby, Banbury; Alexander P. Davidson, Shipston-on-Stour, all of England

[73] Assignee: Alcan International Limited, Montreal, Canada

[21] Appl. No.: 786,334

[22] Filed: Oct. 10, 1985

[30] Foreign Application Priority Data

Oct. 17, 1984 [GB] United Kingdom ............... 8426264

[51] Int. Cl.$^4$ ............................................. C25D 11/04
[52] U.S. Cl. ...................................................... 204/11
[58] Field of Search .................................... 204/11, 24

[56] References Cited

U.S. PATENT DOCUMENTS 3,850,762 11/1974 Smith ..................................... 204/11

Primary Examiner—T. M. Tufariello
Attorney, Agent, or Firm—Cooper, Dunham, Griffin & Moran

[57] ABSTRACT

An anodic aluminum oxide film (12) has a system of larger pores (14) extending in from one face (16) and interconnecting with a system of smaller pores (24) extending in from the other face (26). The film is made by anodizing an aluminum metal substrate, then reducing the applied voltage at a rate to permit partial or complete recovery of the oxide film, either continuously or incrementally in small steps down to a level preferably below 3 V, and separating the oxide film from the substrate.

19 Claims, 4 Drawing Figures

POROUS FILMS AND METHOD OF FORMING THEM

When an aluminium metal substrate is anodized in an electrolyte such as sulphuric acid or phosphoric acid, an anodic oxide film is formed on the surface. This film has a relatively thick porous layer comprising regularly spaced pores extending from the outer surface in towards the metal; and a relatively thin non-porous barrier layer adjacent the metal/oxide interface. As anodizing continues, metal is converted to oxide at the metal/oxide interface, and the pores extend further into the film, so that the thickness of the barrier layer remains constant. The cross-section and spacing of the pores and the thickness of the barrier layer are all proportional to the anodizing voltage.

It is possible to separate the anodix oxide film from the metal substrate by etching away the metal substrate. If the barrier layer is also then removed by dissolution in acid or akali, there remains a porous anodic aluminum oxide film. Such films are useful as filters for example for desalination of salt water, dewatering of whey or for dialysis. Other uses include bacterial filters for cold sterilization, and gas cleaning.

DEA 2444541 describes the separation of such anodic oxide films from their metal substrates by the use of aqueous mercuric chloride solution, or bromine solution, or weak hydrochloric acid solution. These all act by dissolving the metal substrate and without substantially affecting the pore structure of the film.

The minimum pore diameter is generally determined by the intended use of the film, for example as a filter. The user generally requires a given retention (minimum pore diameter) coupled with maximum flow rate. Now, flow rate is proportional to the fourth power of the pore diameter, and inversely proportional to the pore length. It is a problem that conventional anodic oxide filters, in which the pores are essentially uniform and parallel, are not well adapted to meet this requirement. If flow rate is to be maximized, the film needs to be thin and fragile; while if a stronger thicker film is used, flow rate is reduced.

Smith (U.S. Pat. No. 3,850,762) seeks to reduce pore diameter by heating his film in water to swell the oxide and close the pores. While this technique can certainly reduce pore diameter, it is uncertain, non-uniform, and not easily controlled.

In the anodic oxide films of the present invention, a system of larger pores extends in from one face and interconnects with a system of smaller pores extending in from the other face. Pore size is determined by the minimum diameters of the smaller pores, while flow rates are determined largely by the length of the smaller pores which can be made very short. The films of this invention thus have a structure substantially different from those disclosed by Smith, and are capable of improved filtering performance compared to those of Smith.

The films of this invention may be made by separating an anodic oxide film from an aluminium metal substrate without destroying the substrate. This may be done by immersing the substrate with an adherent anodic oxide film in an electrolyte such as sulphuric acid and anodizing it under a progressively reduced voltage and removing the oxide film from the substrate. A technique of this kind is described in an article by R. W. Thomas in Trans. Inst. Metal Fin., 1976, 54, 80–90.

Thomas gave the following instructions for voltage reduction: transfer the anodized specimens to 200 g/l sulphric acid at 23°–25° C. and apply 18–20 V AC; wait until a steady current is flowing, which should be from 1 to 2 $A/dm^2$ and continue anodizing for 1 min; reduce the AC voltage slowly to less than 4 V taking at least 1 min. to do so; hold at 4 V for a further minute and then switch off; wait for the oxide film to separate spontaneously from the substrate and recover the film. Thomas commented that two conditions are necessary before an anodic oxide coating can be separated from the metallic substrate. The first is a slow voltage reduction which converts the barrier layer into a porous film. The second is a period of chemical dissolution in which the degenerate barrier layer is preferentially dissolved. Thus Thomas' technique can be regarded as simply a rapid way of dissolving the barrier layer, by using electrolytic action to improve penetration by solvent and speed up chemical dissolution. And Thomas' films can be regarded as having essentially uniform parallel pores, similar to those of Smith.

The Thomas voltage reduction technique used alternating current; indeed, AC conditions may have been necessary to achieve the chemical dissolution of the barrier layer on which Thomas relied. But a disadvantage of AC is that gas tends to be evolved at the metal substrate surface during the cathodic part of the cycle, and the gas bubbles are likely to cause spalling (localized separation from the substrate) and pin-holing of the oxide film, which of course makes it useless as a filter. The method of the present invention uses DC, or alternatively AC under conditions such that no significant gas evolution takes place on the metal substrate.

The Thomas voltage reduction technique was not closely controlled. Applicants have found that close control is necessary, and indeed prefer to use a computer for the purpose. With this control it is possible to obtain an alumina film having a system of larger pores extending in from one face and interconnecting with a system of smaller pores extending in from the other face, and quite different in structure from the films obtained by Thomas' technique.

This invention provides in one aspect an anodic aluminium oxide film having pores extending from one face of the film to the other, including a system of larger pores extending in from one face a distance h into the film, the larger pores having a diameter d near their inner ends, and a system of smaller pores extending in from the other face a distance s into the film, the smaller pores having a substantially uniform minimum diameter p, the system of larger pores interconnecting with the system of smaller pores, such that the inner ends of one or more smaller pores are joined to the inner end of a larger pore and there are substantially no blind larger pores, wherein
$d = 10$ nm–2 microns,
p is at least 2 nm but less than 0.5 d, and
$s = 10$ nm–1.0 micron.

As used herein, nanometer is abbreviated to nm, and:

$$1000 \text{ nm} = 1 \text{ micron} = 10^{-6} \text{m}.$$

This invention provides in another aspect a method of forming a porous anodic aluminium oxide film which method comprises subjecting an aluminium metal substrate to the action of electric current in an electrolyte so as to form a porous anodic oxide film thereon, subjecting the substrate with the porous anodic oxide film thereon to the action of an electric current in an electrolyte and reducing the applied voltage at a rate sufficiently slow that partial or complete recovery of the oxide film keeps step with the voltage reduction, the voltage reduction being effected either continuously or incrementally in steps of not more than the greater of 5 V and 50% of the existing voltage down to a level of not more than 15 V, the electric current used being either DC, or alternatively AC with the extent of cathodic polarization of the metal substrate being limited such that gas evolution does not significantly take place thereon during the cathodic part of the cycle, and separating from the metal substrate and recovering the anodic oxide film.

Reference is directed to the accompanying drawings, in which.

Figure 1:
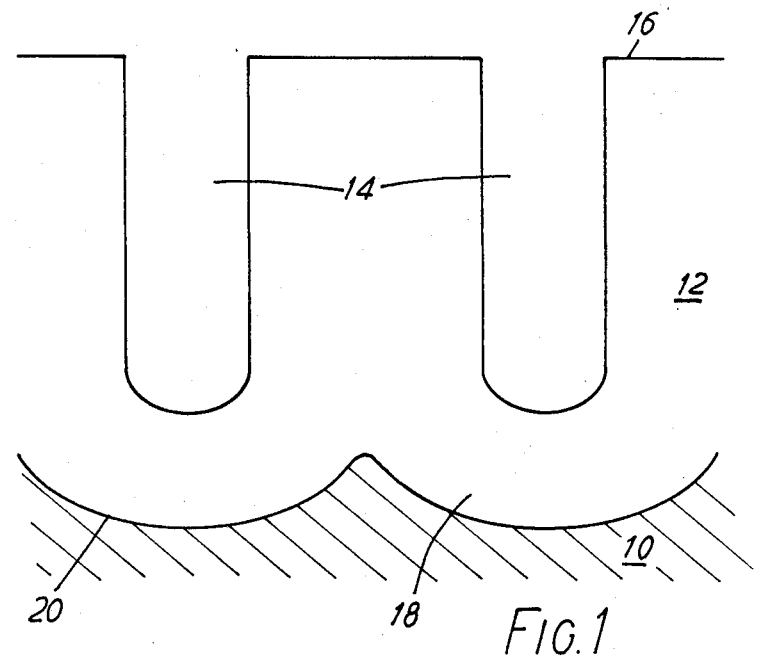
FIG. 1 is a section through a porous anodic oxide film on an aluminium metal substrate.

Referring to FIG. 1, an aluminium metal substrate 10 has been anodized in sulphuric acid to generate an oxide film 12. This film has a relatively thick porous layer comprising regularly spaced pores 14 extending from the outer surface 16 in towards the metal; and a relatively thin non-porous barrier layer 18 adjacent the metal/oxide interface 20.

Figure 2:
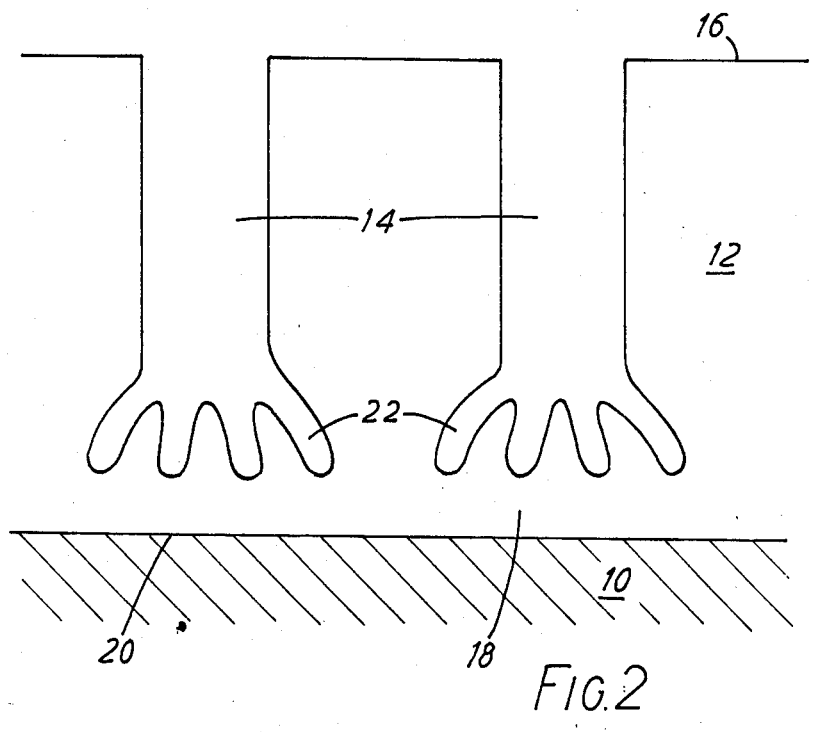
FIG. 2 is the same view as FIG. 1 but taken while the voltage reduction technique of this invention is in progress.

FIG. 2 shows the position after anodizing has been completed and progressive voltage reduction has started. Although the distance between the outer surface 16 of the film and the metal/oxide interface 20 (i.e. the film thickness) is the same, the barrier layer 18 is thinner. This is because several smaller pores 22 have formed at the inner end of each larger pore 14 and extend towards the metal/oxide interface.

Figure 3:
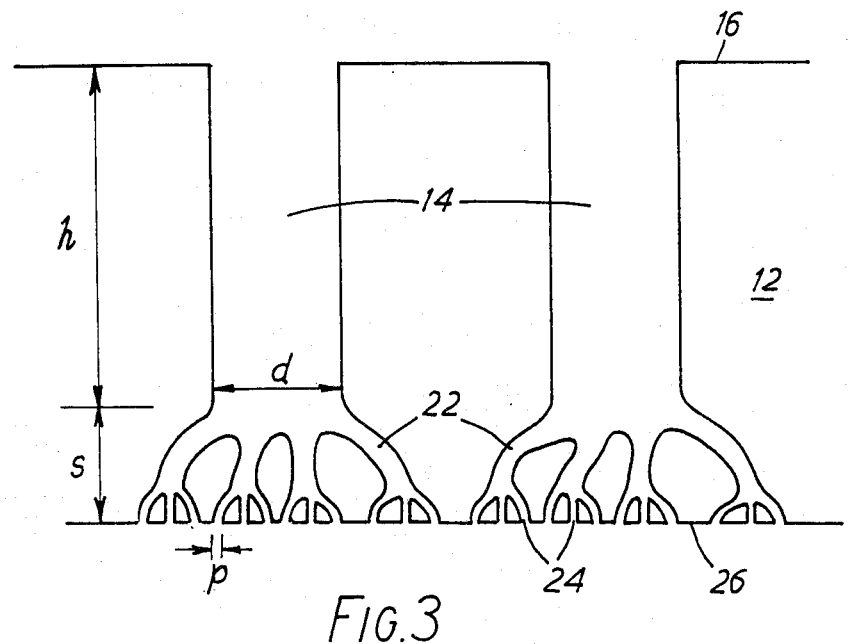
FIG. 3 is a section through a porous alumina film according to this invention.

FIG. 3 shows the position after progressive voltage reduction has been completed. Still smaller pores 24 have formed at the inner end of each smaller pore 22, to the extent that the barrier layer has disappeared. The film 12 has separated from the metal substrate 10 and now exists on its own with pores extending from one face right through to the other. A system of larger pores 14 extends in from one face 16 a distance h into the film, these larger pores having a diameter d near their inner ends. A system of smaller pores 22, 24 extends in from the other face 26 a distance s into the film, the smaller pores having a substantially uniform minimum diameter p.

Figure 4:
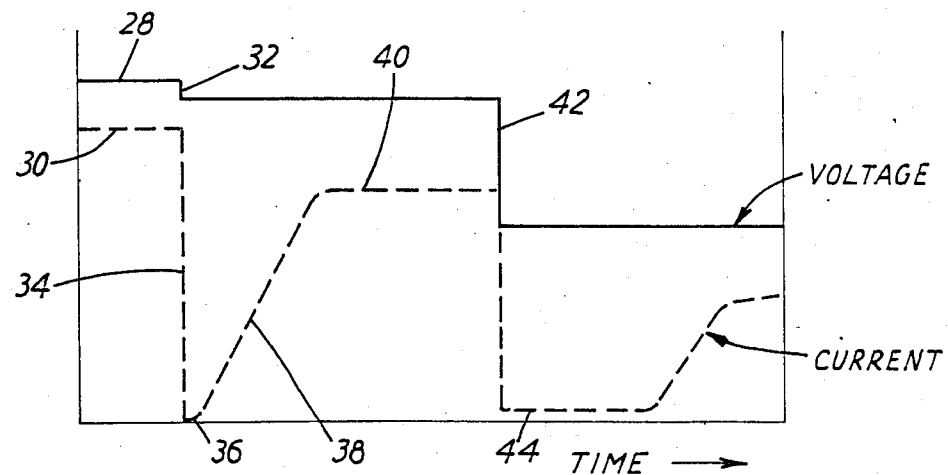
FIG. 4 is a graph showing the effect on current of reduction in the anodizing voltage.

FIG. 4 shows the relationship between applied voltage and anodizing current. During steady-state anodizing both the voltage 28 and the current 30 are steady. A small reduction in the applied voltage, as at 32, leads to a large reduction 34 in the current, presumably because the barrier layer is too thick for anodizing to continue at the lower voltage. After an initial spell 36 at a low level, the current begins to rise at 38. This is the recovery phase, and is presumed to correspond to the thinning of the barrier layer by formation of a system of smaller pores. Later, after recovery has been completed, the current settles at a new level 40, and anodizing continues at the new lower voltage by oxidation of aluminium at the metal/oxide interface. It is believed that oxidation does not occur to any great extent during the recovery phase. After a larger voltage drop 42, there is a longer delay 44 before recovery starts.

When an aluminium metal surface is anodized using a range of electrolytes, a porous anodic oxide film is formed. This comprises a non-porous barrier layer adjacent the metal, whose thickness is approximately 1 nm per volt. The pores have a diameter of approximately 1 nm per volt and are spaced apart approximately 2.5 nm per volt, these figures being largely independent of electrolyte, temperature and whether AC or DC is used. A voltage reduction is followed by a temporary recovery phase, during which the barrier layer is thinned by the formation of new pores branching out from the bases of the old ones. When the barrier layer has reached a thinner value appropriate to the new voltage, recovery is complete, and anodizing continues by oxidation at the metal/alumina interface.

Successive voltage reductions lead to successive branching of the pores at their bottom ends. By terminating the voltage reduction at a very low voltage, only an extremely thin barrier layer is left which is readily dissolved causing separation of the film from the metal substrate.

The starting aluminium metal substrate is preferably high purity aluminium sheet, for example 99.9% or even 99.99% aluminium. Metal foil could be used, but sheet is preferred because it ensures the absence of pin-holes. Lower purity aluminium could be used, but may contain inclusions that affect formation of the desired network of pores where a very fine network is desired. The metal surface may be prepared by chemical polishing, but any other method of providing a smooth surface, e.g. caustic etching, is satisfactory. Ordinary bright rolled sheet may be used. The metal surface is cleaned and degreased and is then ready for anodizing.

Anodizing conditions are not critical. Direct current is preferably used, but alternating, pulsed or biased current may be used. An electrolyte is used that gives rise to a porous anodic oxide film, sulphuric, phosphoric, chromic and oxalic acids and mixtures and these being suitable. Although electrolytes are generally acid, it is known to be possible to use alkaline electrolytes such as borax, or even molten salt electrolytes. It is believed to be the simultaneous dissolution/film formation mechanism that gives rise to porous films, and this mechanism can operate in an acid or alkaline environment. Anodic oxide films generally contain a proportion, sometimes a substantial proportion up to 15% or more, of anion derived from the anodizing electrolyte.

The applied voltage is raised from zero to a level designed to achieve a desired pore diameter and pore spacing (as discussed in more detail below) and continued for a time to achieve a desired film thickness. For example, using a 0.4 M orthophosphoric acid electrolyte at 25° to 30° C. at a current density of 1.5 A/dm$^2$, a voltage of 150 to 160 volts needs to be applied for around 100 to 120 minutes to achieve a film thickness of 40 to 60 microns.

The anodizing voltage may be chosen to achieve the desired pore spacing. For wide pore spacings high voltages may be used, and we ourselves have used up to 700 V. But at these levels it is necessary to use dilute electrolyte, (e.g. 0.01% oxalic or phosphoric acid), because the use of electrolyte of conventional concentration (e.g. 0.4 M phosphoric acid) results in dielectric breakdown of the film which prevents further anodizing.

The voltage reduction procedure may be carried out in the same electrolyte as that used for anodizing. Alternatively, the electrolyte may be changed either before or during the voltage reduction procedure. Since separation of the film from the substrate depends on chemical and field-assisted chemical dissolution of film material, the electrolyte should be chosen to be effective for this purpose. Sulphuric acid and oxalic acid have been successfully used. However, phosphoric acid is preferred for the voltage reduction procedure, particularly the final stages, for two reasons. First, since phosphoric acid exerts a rather powerful solvent effect on alumina, recovery of the anodic film tends to be faster as the voltage is reduced. Second, phosphate inhibits hydration of alumina, which might otherwise occur, either during or more likely after the voltage reduction procedure, with swelling and loss of control over pore size. Where hydration of alumina is desired, e.g. in order to further reduce the pore size, the use of phosphoric acid should be avoided.

It may be useful to effect some chemical dissolution of the barrier layer of the film between the anodizing and the voltage reduction steps. This applies particularly when anodizing has been effected at high voltage, e.g. above 200 V. Thereafter the barrier layer may be thinned by chemical dissolution down to a value at which voltage reduction using the chosen electrolyte can be started.

During the voltage reduction procedure, the applied voltage is reduced from the anodizing voltage (or as noted above from a lower starting voltage) down to a value of not more than 15 V, preferably not more than 12 V. When this reduction is effected by increments, each incremental reduction should be by an amount not more than the greater of 5 V and 50%, preferably not more than the greater of 4 V and 25%, of the existing voltage. And sufficient time should be allowed for partial or complete recovering of the film between incremental reductions. If the voltage is abruptly reduced by more than the greater of 5 V and 50% of the existing voltage, then the likely result is that smaller pores will be formed in the base of only some of the original larger pores, so that many of the larger pores will become blind. In order to avoid any risk of this, voltage reduction is preferably effected by increments of no more than 5% of the existing voltage, or by no more than 0.3 V where the existing voltage is less than 6 V.

The voltage reduction step may be performed using continuous or pulsed DC, or alternatively AC with the extent of cathodic polarization of the metal substrate being limited such that gas evolution does not significantly take place thereon during the cathodic part of the cycle. A biased AC waveform is also contemplated and may be advantageous.

Sufficient time is allowed between incremental voltage reductions for partial or complete recovery of the film. It is envisaged that recovery involves penetration of the barrier layer by new pores of a size and spacing appropriate to the reduced voltage, and it is necessary to the method that new pore formation should take place as the voltage is reduced. After recovery is complete, anodizing continues normally by formation of fresh oxide at the metal/oxide interface. As this is not desired, a further voltage reduction should be effected either during recovery, or immediately on completion of recovery of the film.

Film recovery after an incremental voltage reduction can easily be monitored by detecting the rate of increase of current with time. As shown in FIG. 4, this rate of increase reaches a maximum along the line 38 as recovery gets under way, and later falls to zero along the line 40 when recovery is complete. According to a preferred procedure, the maximum rate of increase of current with time is detected, and a further incremental voltage reduction made when the rate of increase of current with time falls to a fraction, generally within the range of 0.01 to 0.9, preferably 0.025 to 0.75, of the maximum. A computer can readily be programmed to control the voltage reduction procedure in this way.

The voltage reduction is preferably continued down to a value less than 3 V. Separation of the anodic oxide film from the substrate may take place while voltage reduction continues, in which case the separated film is simply recovered. If separation has not occurred, the coated substrate may be held in the electrolyte until separation does take place. Alternatively, the coated substrate may be transferred to a different aqueous medium having solvent effect on alumina, for example phosphoric acid or ammonia or sodium hydroxide. If the voltage reduction procedure is stopped before the minimum voltage has been reached, then the standing time required to achieve film separation is increased. If voltage reduction is stopped above 6 V, this standing time is likely to be unacceptably high. Depending on the desired diameter and length of the smaller pores in the oxide film, the film may either be removed from the electrolyte immediately on separation from the metal substrate, or may be left to soak in the electrolyte for a period of time to effect desired chemical dissolution.

Voltage reduction may be effected continuously, for example exponentially rather than incrementally. But continuous voltage reduction is difficult to monitor so as to ensure that the desired film recovery is taking place. Continuous voltage reduction is mainly useful when the rate of film recovery is known from previous work.

Factors which affect film recovery time and time for separation of the film from the metal substrate include the nature, the concentration, and the temperature of the electrolyte. Faster times are achieved by using electrolytes having greater dissolving power for alumina; higher concentrations of electrolyte; and higher electrolyte temperatures. It will generally, though not always, be desired to achieve fast times, so as to minimise the inevitable chemical dissolution of the anodic oxide film which takes place all the time.

In some cases however it may be preferred to enchance chemical dissolution in relation to pore formation. This may be done by using an electrolyte having greater dissolving power for alumina, or by increasing the electrolyte concentration or temperature, during the voltage reduction step. Or the film may be allowed to remain in the electrolyte after the voltage reduction step has been completed and after separation from the metal substrate has occurred. Combinations of these methods may be used. They can result in films in which the branched pore structure is partly dissolved away, or even wholly dissolved away to leave a film with separate unbranched pores extending all the way through. By these methods, further control can be exercised to the desired end of achieving a film having a predetermined minimum pore size.

In general, suitable electrolyte concentrations will fall within the range of 0.1 to 8 mol/l; and suitable electrolyte temperature within the range of ambient to 95° C. For example, phosphoric acid is preferably used at a concentration of 0.3 to 1.0 mol/l and a temperature of from 25° to 35° C.

Even after the anodic oxide film has ceased to be chemically bonded to the metal substrate, surface tension effects may hold it in position. When this stage is reached, the coated substrate can be removed from the electrolyte, thoroughly rinsed, and dried until the film can be just lifted off the substrate. Particularly when a thin anodic oxide film is desired, the whole method, anodizing, voltage reduction and film separation, can be performed continuously. Thick films, of e.g. 50 microns, are self supporting and moderately strong, but thin films may need to be supported on a porous substrate.

Reference is directed to FIG. 3 of the drawings and particularly to the dimensions indicated thereon. The dimension d is the diameter of the larger pores at their inner ends. It is determined simply by the anodizing voltage, and has a value (in nm) approximately equal to the applied voltage. The value of d lies in the range of 10 nm (obtained by anodizing at about 10 V) up to 1.5 or even 2 microns (obtained by anodizing at up to 1000 V and widening the pores by chemical dissolution). Values of 0.05 to 0.5 microns are likely to be particularly suitable when the film is intended for use as a filter.

The diameter of the larger pores 14 at their outer ends is less important. These diameters may be larger than d by virtue of chemical dissolution. The spacing between the larger pores 14 is generally uniform and approximately 2.5 times (in nm) the value of d (in volts).

The dimension h represents the length of the larger pores 14, and is determined simply by the anodizing conditions chosen and the length of time for which anodizing is continued. The value of h may be from 0.1 to 100 microns, or even more, with the proviso that it is preferably greater than d. Films where h has a value in the range 0.5 to 5.0 microns are fragile and require support, but are of value for filters where small pore size has to be combined with high flow-through rates. Films in which h is from 30 to 70 microns have the advantage of being self-supporting The dimension p is the diameter of the smallest pores 24. The value of p is determined by the minimum voltage at which significant new pore formation is effected during the voltage reduction procedure. By anodizing at 2 V it may be possible to generate pores of diameter 2nm, but some pore enlargement is likely as a result of chemical dissolution, which becomes an increasingly dominant effect in small pores. The value of p is specified at as being less than 0.5 d, preferably less than 0.25 d, because when the value of p is too close to that d, there is danger of film collapse and degredation. Preferred values of p are in the range 5 to 100 nm, depending on the purpose for which the film is to be used.

It should be understood that FIG. 3 is an idealized representation. It is unlikely that in practice the system of smaller pores 22, 24 would be as uniform or as well characterized as shown. There might be different numbers of smaller pores branching from the base of different larger pores, though there would generally be more than one smaller pore for each larger pore. The three generations of pores 14, 22 24 illustrated would not be so clearly differentiated in practice. While the minimum pore diameter p is shown as being positioned at one face of the anodic oxide film, this would not necessarily be so in practice. As a result of chemical dissolution, the minimum pore diameter would tend to be a little in from the surface. However, it is an advantage of the films of this invention that the minimum pore diameter is located close to a surface and not deep within the film. .

The dimension s represents approximately what was the barrier layer in the original anodized film. This dimension may have been reduced by chemical dissolution during or after the voltage reduction procedure; or increased by additional anodizing performed during the voltage reduction procedure. To ensure uniform pore size, the value of s should preferably be greater than that of p. However, for optimum flow-through characteristics, the value of s should be as small as possible and preferably less than h. The range for s is specified as 10 nm to 1.0 microns, preferably 20 to 500 nm. The value of s may be reduced as desired by chemical dissolution of the films after the voltage reduction step has been completed and the film separated from the metal substrate.

The products of this invention are useful for all purposes for which porous thin film find application. These include use as filters for liquids and gases. For use as filters for liquids, the films of this invention have the following advantages over conventional polymeric asymmetric filters:

(a) Polymers are mostly hydrophobic and require treatment before they can be used for filtering aqueous liquids. The films of this invention are hydrophilic.

(b) Polymeric membranes tend to be compacted under pressure, resulting in loss of ability to filter. The films of this invention are resistant to compaction.

(c) Polymeric filters tend to swell in water, resulting in alteration of filtering characteristics. Swelling of the films of this invention in water can readily be controlled or prevented.

(d) Polymers have poor temperature resistance, and often cannot be steam sterilized. The films of this invention can be steam sterilized.

(e) Polymers often have poor resistance to organic solvents such as alcohols or esters produced in fermentation processes. The films of this invention have good solvent resistance.

(f) Polymeric filters cannot be used at high temperatures, for example for gas cleaning. The films of this invention are useful at high temperatures.

(g) When thin polymeric films are positioned on a porous support, the polymer tends to balloon through the pores of the support. The films of the present invention do not show this tendency.

(h) Polymeric membranes often have a tortuous pore structure resulting in poor flow-through characteristics. The films of the present invention are mainly composed of straight parallel pores.

(i) Uniform pore size is difficult to achieve in polymeric materials, but is readily achieved in the films of the present invention.

(j) Asymmetric polymeric filters typically have a surface porosity of 0.1 to 1%. Films of the present invention typically have porosities of around 10%, resulting in much better flow-through rates.

EXAMPLE 1

A 99.98% aluminium panel, 5 cm × 5 cm, was chemically brightened and then anodized in 0.25 M oxalic acid at 25° C. For the anodizing procedure a current limit of 1.25 A and a voltage limit of 70 V were preset on the power supply. The resulting film was about 15 microns thick.

The voltage reduction procedure was started immediately on the completion of anodizing using the same electrolyte. The voltage was stepped down incrementally from the voltage at the end of the anodizing stage to about 0.1. V. The magnitude of each step was the greater of 5% of the existing voltage or 0.3 V. Each time the voltage was reduced, the current fell to a very low value and then rose passing through a point of infexion, i.e. di/dt, was at a maximum. When di/dt fell to 2.5% of the maximum value, the subsequent voltage step as effected. The voltage reduction procedure took 48 minutes.

The sample was then transferred to a 50% by volume $H_3PO_4$ solution and after 2 to 3 minutes small bubbles were observed at the metal/film interface. The sample was removed, well rinsed and dried in an oven. After drying, the film fell from the metal.

The fracture section of the membrane was examined using a scanning electron microscope. The film parameters were:

d ~ 50 nm
p ~ 10 nm
s ~ 250 nm.

EXAMPLE 2

A specimen similar to that of Example 1 was anodized in 0.4 M $H_3PO_4$ at 25° C. with a current limit of 0.75 A and a voltage limit of 160 V. Otherwise anodizing was similar to Example 1 giving a film above 8 microns thick. The voltage reduction procedure was started immediately on the completion of anodizing using the same electrolyte.

For the voltage reduction procedure a suitable programmable power supply was controlled by an HP 9826 computer using an HP 3497A data logger to monitor current and voltage. Certain parameters were preset on the computer:

percentage voltage step—5 %;
minimum voltage step—0.3 V;
terminal voltage—0.1 V;
percentage di/dt max—75 %.

Thus the computer stepped down the voltage in increments of the greater of 0.3 V or 5% of the existing voltage from the value monitored at the end of anodizing to the first value equal to or less than 0.1 V, when the power supply automatically switched off. Each voltage reduction after the first one was controlled by a system involving monitoring the rate of change of current, di/dt. Initially when the voltage was reduced, the current fell, so di/dt was negative. Subsequently, the current rose, and during this period the computer continually updated in its memory the maximum in di/dt, and looked for a value fo di/dt which was less than or equal to 75% of the maximum. When this condition was satisfied, the computer caused a further voltage reduction.

On completion of this procedure, the membrane was detached but not separated from the aluminium substrate. Separation was brought about by immersing the sample of 50% by volume $H_3PO_4$ at room temperature for about 2 minutes. After rinsing and drying the film was separated from the surface of the metal.

A scanning electron microscope examination of the membrane revealed its morphological parameters to be:

d ~ 120 nm
p ~ 30 nm
s ~ 150 nm.

EXAMPLE 3

This Example shows the use of high anodizing voltages to generate oxide films having wide pore spacings.

Experiments were carried out using solutions of 0.01% (wt) oxalic acid and 0.01% (vol) orthophosphoric acid. For investigations above 0° C. aqueous solutions were used; below 0° C., 50/50 (vol/vol) water-ethylene glycol solutions were employed. A glass container was used as the anodizing bath the sample being placed a maximum distance from a platinum cathode (23 cm). To achieve good agitation a mechanical rotation stirrer was placed below the sample. Anodizing was carried out with 2 cm×4 cm aluminium sheet (99.98%) using voltage control conditions, the anodizing voltage being present at 670 V prior to switching on. During anodizing the current transients were monitored.

With 0.01% oxalic acid at −25° C. it was noted that the current density started at a peak value of 1.5 mA $cm^{-2}$ and slowly decayed to a value approximately 0 mA $cm^{-2}$ over a period of 24 hours. At +50° C. the initial current density was 4 mA $cm^{-2}$ which again decayed over a 24 hour period.

After anodizing the sample was transferred to 0.4 M phosphoric acid and held at 25° C. until the barrier layer of the oxide film had been reduced in thickness from about 670 nm (corresponding to an anodizing voltage of 670 V) down to about 180 nm. The anodic film was then stripped from the substrate using the voltate reduction technique described in Example 2, and observed using high resolution scanning electron microscope techniques. The micrographs showed that thicker films were produced at −25° C. (5 microns) as compared to +50° C. (1.5 microns). In both cases, a cell size of approximately 1.75 microns was observed. Similar results were obtained for samples anodized using 0.01% (vol) orthophosphoric acid.

Further experiments using 50/50 (vol/vol) orthophosphoric acid have shown it possible to widen the pores in the centre of the cells up to a value of 400 nm or even greater.

EXAMPLE 4

A specimen similar to that of Example 1 was anodized in an electroylyte containing 0.4 mol/l $H_3PO_4$ and 10 g/l oxalic acid at 25° C. The anodizing procedure followed that of Example 2.

The mixed electrolyte was also used during the voltage reduction process. This was as described in Example 2 except that the maximum percentage di/dt was present at 50%.

Separation was also accomplished following the method of Example 2. Subsequently, the separated membrane was immersed in 50% by volume $H_3PO_4$ at room temperature for 50 min, then rinsed and dried. This procedure substantially removed the system of smaller pores.

A scanning electron microscope examination revealed a pore size at the surface where the smaller pores were originally present, of 0.35 microns. More than 95% were clear of any residual bridging material. At the opposite surface the pore size was 0.3 microns.

We claim:

1. An anodic aluminium oxide film (12) having pores extending from one face of the film to the other,
   including a system of larger pores (14) extending in from one face (16) a distance h into the film, the larger pores having a diameter d near their inner ends, and a system of smaller pores (22, 24) extending in from the other face (26) a distance s into the film, the smaller pores having a substantially uniform minimum diameter p,
   the system of larger pores interconnecting with the system of smaller pores, such that the inner ends of one or more smaller pores are joined to the inner end of a larger pore and there are substantially no blind larger pores,
   wherein
   $d = 10$ nm–2 microns,
   p is at least 2 nm but less than 0.5 d, and
   $s = 10$ nm–1.0 micron.

2. An anodic aluminium oxide film as claimed in claim 1, wherein h is greater than d.

3. An anodic aluminium oxide film as claimed in claim 1, wherein
   $d = 0.05$–0.5 microns,
   $h = 0.1$–100 microns,
   $p = 5$–100 nm and less than 0.25 d, and
   $s = 20$–500 nm.

4. A method of forming a porous anodic aluminium oxide film which method comprises
   subjecting an aluminium metal substrate to the action of electric current in an electrolyte so as to form a porous anodic oxide film thereon,
   subjecting the substrate with the porous anodic oxide film thereon to the action of an electric current in an electrolyte and reducing the applied voltage at a rate sufficiently slow that partial or complete recovery of the current keeps step with the voltage reduction, the voltage reduction being effected either continuously or incrementally in steps of not more than the greater of 5 V and 50% of the existing voltage down to a level of not more than 15 V,
   the electric current used being either DC, or alternatively AC with the extent of cathodic polarization of the metal substrate being limited such that gas evolution does not significantly take place thereon during the cathodic part of the cycle,
   and separating from the metal substrate and recovering the anodic oxide film.

5. A method as claimed in claim 4, wherein voltage reduction is effected incrementally and film recovery is monitored by detecting the maximum rate of increase of current with time and reducing the voltage by a further increment when the rate of increase of current with time falls to a value of from 0.01 to 0.9 of the maximum figure.

6. A method as claimed in claim 4, wherein the electrolyte used for anodizing is an acid electrolyte.

7. A method as claimed in claim 4, wherein the substrate is Al of at least 99.9% purity.

8. A method as claimed in claim 4, wherein different electrolytes, or different concentrations of the same electrolyte, are used for the anodizing and the voltage reduction steps.

9. A method as claimed in claim 4, wherein the electrolyte used for the voltage reduction step has a concentration of 0.1 to 8 mol/litre and a temperature of from ambient to 95° C.

10. A method as claimed in claim 4, wherein the electrolyte used for the voltage reduction step is phosphoric acid.

11. A method as claimed in claim 4, wherein the voltage reduction is effected incrementally in steps of no more than 5% of the existing voltage or by no more than 0.3 V where the existing voltage is less than 6 V.

12. A method as claimed in claim 4, wherein the voltage reduction is continued down to a value less than 3 V.

13. A method as claimed in claim 4, performed so that the resulting film has a system of larger pores extending in from one face and interconnecting with a system of smaller pores extending in from the other face of the film.

14. A method as claimed in claim 13, wherein the film is subjected to the action of an electrolyte to partly or completely dissolve away that part of the film containing the system of smaller pores.

15. An aluminum oxide sheet having two substantially parallel major faces with pores extending from one face of the sheet to the other,
    including a system of larger pores extending from one face into the sheet and a system of smaller pores extending in from the other face,
    the system of larger pores interconnecting with the system of smaller pores such that the inner ends of one or more smaller pores are joined to the inner end of a larger pore and there are substantially no blind larger pores.

16. An aluminum oxide sheet as claimed in claim 15, produced by anodizing an aluminum surface and detaching the aluminum oxide layer formed thereby from said surface.

17. An aluminum oxide sheet as claimed in claim 15, wherein the diameter of the larger pores near their inner end is 10 nm–2 microns, the diameter of the smaller pores is at least 2 nm and the smaller pores extend a distance of 10 nm to 1.0 micron into the sheet.

18. An aluminum oxide sheet as claimed in claim 15, wherein said larger pores are aligned substantially perpendicular to the face from which they extend.

19. A filter consisting essentially of the aluminum oxide sheet of claim 15.

* * * * *